US008784534B2

(12) United States Patent
Kamakoti et al.

(10) Patent No.: US 8,784,534 B2
(45) Date of Patent: Jul. 22, 2014

(54) PRESSURE-TEMPERATURE SWING ADSORPTION PROCESS

(75) Inventors: Preeti Kamakoti, Summit, NJ (US);
Daniel P. Leta, Flemington, NJ (US);
Harry W. Deckman, Clinton, NJ (US);
Peter I. Ravikovitch, Princeton, NJ (US); Thomas N. Anderson, Houston, TX (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 150 days.

(21) Appl. No.: 13/406,116

(22) Filed: Feb. 27, 2012

(65) Prior Publication Data

US 2012/0222553 A1 Sep. 6, 2012

Related U.S. Application Data

(60) Provisional application No. 61/447,869, filed on Mar. 1, 2011, provisional application No. 61/447,806, filed on Mar. 1, 2011, provisional application No. 61/447,812, filed on Mar. 1, 2011, provisional application No. 61/447,824, filed on Mar. 1, 2011, provisional application No. 61/447,848, filed on Mar. 1, 2011, provisional application No. 61/447,835, filed on Mar. 1, 2011, provisional application No. 61/447,877, filed on Mar. 1, 2011.

(51) Int. Cl.
*B01D 53/04* (2006.01)
*B01D 53/047* (2006.01)

(52) U.S. Cl.
USPC .......... 95/97; 95/98; 95/99; 95/100; 95/115; 95/136; 95/139

(58) Field of Classification Search
USPC .......... 95/96–100, 103–106, 114, 115, 130, 95/136, 139, 900, 902; 585/820, 823, 826; 423/230; 502/60
See application file for complete search history.

(56) References Cited

U.S. PATENT DOCUMENTS

| | | | |
|---|---|---|---|
| 2,989,383 A | 6/1961 | Miller |
| 3,594,983 A | 7/1971 | Yearout |
| 4,094,652 A | 6/1978 | Lowther |
| 4,269,611 A | 5/1981 | Anderberg |
| 4,312,641 A | 1/1982 | Verrando et al. |
| 4,329,158 A | 5/1982 | Sircar |
| 4,350,501 A | 9/1982 | Bannon |
| 4,405,343 A | 9/1983 | Othmer |
| 4,424,837 A | 1/1984 | Farrell |
| 4,433,707 A | 2/1984 | Farnham |
| 4,640,694 A | 2/1987 | Leitgeb et al. |
| 4,702,903 A | 10/1987 | Keefer |
| 4,729,982 A | 3/1988 | Thistlethwaite et al. |
| 4,753,919 A | 6/1988 | Whittenberger |
| 4,772,579 A | 9/1988 | Thistlethwaite et al. |
| 4,801,308 A | 1/1989 | Keefer |
| 4,914,218 A | 4/1990 | Kumar et al. |
| 4,968,329 A | 11/1990 | Keefer |
| 5,057,296 A | 10/1991 | Beck |
| 5,074,892 A | 12/1991 | Leavitt |
| 5,082,473 A | 1/1992 | Keefer |
| 5,089,034 A | 2/1992 | Markovs et al. |
| 5,098,684 A | 3/1992 | Kresge et al. |
| 5,102,643 A | 4/1992 | Kresge et al. |
| 5,108,725 A | 4/1992 | Beck et al. |
| 5,141,725 A | 8/1992 | Ramprasad et al. |
| 5,171,333 A | 12/1992 | Maurer |
| 5,225,174 A | 7/1993 | Friesen et al. |
| 5,256,172 A | 10/1993 | Keefer |
| 5,271,762 A * | 12/1993 | Schoofs et al. ............... 95/120 |
| 5,298,054 A | 3/1994 | Malik |
| 5,516,745 A | 5/1996 | Friesen et al. |
| 5,626,033 A | 5/1997 | Tamhankar et al. |
| 5,669,962 A | 9/1997 | Dunne |
| 5,792,897 A | 8/1998 | Rosser, Jr. et al. |
| 5,846,295 A | 12/1998 | Kalbassi et al. |
| 5,958,368 A | 9/1999 | Ryoo et al. |
| 6,051,050 A | 4/2000 | Keefer et al. |

(Continued)

FOREIGN PATENT DOCUMENTS

| | | |
|---|---|---|
| CN | 101475430 A | 7/2009 |
| EP | 1 421 986 B1 | 5/2004 |

(Continued)

OTHER PUBLICATIONS

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.
Ruthven, D. M., Thaeron, C. "Performance of a parallel passage adsorbent contactor", Separation and Purification Technology, vol. 12 (1997), pp. 43-60.
Suib, Steven L., O'Young, Chi-Lin "Synthesis of Octahedral Molecular Sieves and Layered Materials", Marcel Dekker, Inc., vol. 69 (1997), pp. 215-231.
Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

(Continued)

*Primary Examiner* — Frank Lawrence
(74) *Attorney, Agent, or Firm* — Bruce M. Bordelon; David M. Weisberg

(57) ABSTRACT

A pressure-temperature swing adsorption process for the removal of a target species, such as an acid gas, from a gas mixture, such as a natural gas stream. Herein, a novel multi-step temperature swing/pressure swing adsorption is utilized to operate while maintaining very high purity levels of contaminant removal from a product stream. The present process is particularly effective and beneficial in removing contaminants such as $CO_2$ and/or $H_2S$ from a natural gas at high adsorption pressures (e.g., at least 500 psig) to create product streams of very high purity (i.e., very low contaminant levels).

33 Claims, No Drawings

(56) References Cited

U.S. PATENT DOCUMENTS

| | | |
|---|---|---|
| 6,063,161 A | 5/2000 | Keefer et al. |
| 6,077,457 A | 6/2000 | Friesen et al. |
| 6,080,226 A | 6/2000 | Dolan et al. |
| 6,136,222 A | 10/2000 | Friesen et al. |
| 6,197,092 B1 | 3/2001 | Butwell et al. |
| 6,293,998 B1 | 9/2001 | Dolan et al. |
| 6,315,817 B1 | 11/2001 | Butwell et al. |
| 6,336,957 B1 * | 1/2002 | Tsymerman ............ 95/115 |
| 6,406,523 B1 | 6/2002 | Connor et al. |
| 6,475,265 B1 | 11/2002 | Baksh et al. |
| 6,514,318 B2 | 2/2003 | Keefer |
| 6,607,584 B2 | 8/2003 | Moreau et al. |
| 6,629,525 B2 | 10/2003 | Hill et al. |
| 6,651,658 B1 | 11/2003 | Hill et al. |
| 6,652,627 B1 | 11/2003 | Tonkovich et al. |
| 6,691,702 B2 | 2/2004 | Appel et al. |
| 6,905,592 B2 | 6/2005 | Bence et al. |
| 7,049,259 B1 | 5/2006 | Deckman et al. |
| 7,231,784 B2 | 6/2007 | Howard et al. |
| 7,270,792 B2 | 9/2007 | Deckman et al. |
| 7,491,250 B2 | 2/2009 | Hershkowitz et al. |
| 7,507,274 B2 | 3/2009 | Tonkovich et al. |
| 7,524,358 B2 | 4/2009 | Saxena et al. |
| 7,527,670 B2 | 5/2009 | Ackley et al. |
| 7,799,730 B2 | 9/2010 | Ringer et al. |
| 7,803,215 B2 | 9/2010 | Russell et al. |
| 7,938,886 B2 | 5/2011 | Hershkowitz et al. |
| 7,959,720 B2 | 6/2011 | Deckman et al. |
| 2003/0015093 A1 | 1/2003 | Wegeng et al. |
| 2003/0116016 A1 | 6/2003 | Monzyk et al. |
| 2005/0045030 A1 * | 3/2005 | Tonkovich et al. ......... 95/90 |
| 2006/0075777 A1 | 4/2006 | Howard et al. |
| 2006/0102519 A1 | 5/2006 | Tonkovich et al. |
| 2006/0162556 A1 | 7/2006 | Ackley et al. |
| 2006/0165574 A1 | 7/2006 | Sayari |
| 2006/0210454 A1 | 9/2006 | Saxena et al. |
| 2006/0249020 A1 | 11/2006 | Tonkovich et al. |
| 2007/0085227 A1 | 4/2007 | Tonkovich et al. |
| 2007/0240449 A1 | 10/2007 | Howard et al. |
| 2007/0246106 A1 | 10/2007 | Tonkovich et al. |
| 2008/0028286 A1 | 1/2008 | Chick |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 * | 11/2008 | Deckman et al. ......... 96/140 |
| 2008/0314245 A1 | 12/2008 | Hershkowitz et al. |
| 2009/0151562 A1 | 6/2009 | Russell et al. |
| 2009/0211441 A1 * | 8/2009 | Reyes et al. ............ 95/96 |
| 2009/0217691 A1 | 9/2009 | Schmidt et al. |
| 2009/0294348 A1 | 12/2009 | Krogue et al. |
| 2009/0308248 A1 | 12/2009 | Siskin et al. |
| 2009/0326279 A1 | 12/2009 | Tonkovich et al. |
| 2010/0251887 A1 | 10/2010 | Jain |
| 2010/0263534 A1 | 10/2010 | Chuang |
| 2010/0326272 A1 | 12/2010 | Asaro et al. |
| 2012/0222551 A1 | 9/2012 | Deckman |
| 2012/0222552 A1 | 9/2012 | Ravikovitch et al. |
| 2012/0312163 A1 | 12/2012 | Leta et al. |

FOREIGN PATENT DOCUMENTS

| | | |
|---|---|---|
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 02/087730 A2 | 11/2002 |
| WO | 2005/061100 A1 | 7/2005 |
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010/130787 A1 | 11/2010 |

OTHER PUBLICATIONS

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

* cited by examiner

PRESSURE-TEMPERATURE SWING ADSORPTION PROCESS

CROSS-REFERENCE TO RELATED APPLICATION

This application claims priority to U.S. Provisional Ser. No. 61/447,869 filed Mar. 1, 2011, herein incorporated by reference in its entirety. This application further claims priority to related U.S. Ser. Nos. 61/447,806, 61/447,812, 61/447,824, 61/447,848, 61/447,877, and 61/447,835, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to U.S. Ser. Nos. 61/448,117, 61/448,120, 61/448,121, 61/448,123, and 61/448,125, each filed Mar. 1, 2011, 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

The present invention relates to a pressure-temperature swing adsorption process wherein gaseous components that have been adsorbed can be recovered from the adsorbent bed at elevated pressures to eliminate or reduce necessary compression of the adsorbed gaseous components for further transport or processing.

BACKGROUND OF THE INVENTION

Gas separation is important in many industries and can typically be accomplished by flowing a mixture of gases over an adsorbent that preferentially adsorbs a more readily adsorbed component relative to a less readily adsorbed component of the mixture. One of the more important types of gas separation technology is swing adsorption, such as pressure swing adsorption (PSA). PSA processes rely on the fact that under pressure gases tend to be adsorbed within the pore structure of the microporous adsorbent materials or within the free volume of a polymeric material. The higher the pressure, the greater the amount of targeted gas component will be adsorbed. When the pressure is reduced, the adsorbed targeted component is released, or desorbed. PSA processes can be used to separate gases of a gas mixture because different gases tend to fill the micropore or free volume of the adsorbent to different extents.

Another important gas separation technique is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Various methods of supplying heat to the adsorbent for the regeneration cycle have been proposed. These include microwave energy (U.S. Pat. No. 4,312,641), installation of electrical heaters inside the packed adsorbent bed of the adsorber (U.S. Pat. No. 4,269,611) and direct application of electric current to the adsorber for electrodesorption (U.S. Pat. No. 4,094,652). However, many of the conventional TSA processes have cycle times significantly long, often as long as 12 hours, which reduces the overall adsorption and processing capacity of the system.

TSA, as conventionally practiced, has several disadvantages. For example, in directly heated TSA processes, a hot fluid is typically flowed through the adsorption bed to raise the adsorbent temperature. The greater the temperature rise, the more fluid is needed. The desorbed impurities thus end up dispersed in a large volume of heating fluid, and the large amount of heat that is used to raise the adsorbent temperature is often not recoverable. In some cases, the heat is not recovered because many directly heated TSA systems are operated with long adsorption times (days) and much shorter regeneration times. Also, the occasional and gradual adsorption and regeneration cycles give rise to concentration and flow variations in downstream equipment that can be difficult to manage in an otherwise steady state process plant. Improper or inadequate regeneration of the adsorption beds can also significantly impact the overall purity of the product streams from the adsorption process. Heat management and the cyclic nature of the TSA processes also affect the overall system capacity and product purities.

Thus, there is a need in the art for temperature swing adsorption processes that can overcome at least some of these problems as well as having faster cycle times, leading to higher system capacities, while maintaining or improving the final product stream purity, especially with regard to temperature swing adsorption processes.

SUMMARY OF THE INVENTION

In accordance with the present invention, there is provided a process for the separation of a target gas component from a gas mixture, which process comprises: a) conducting the gas mixture containing said target gas component to an adsorption step by introducing it into the feed input end of an adsorbent bed selective for adsorbing said target gas component, which adsorbent bed has a feed input end and a product output end and which adsorbent bed is operated at a first pressure and at a first temperature wherein said target gas component is adsorbed by the adsorbent bed and wherein a gaseous product depleted in the target gas component exits the product output end of said adsorbent bed; b) stopping the introduction of said gas mixture to said adsorbent bed before breakthrough of said target gas component reaches the product output end of said adsorbent bed; c) sealing the feed input end of said adsorbent bed; d) heating the sealed adsorbent bed to a second temperature higher than said first temperature, resulting in desorption of at least a portion of said target gas component from said adsorbent bed and thereby resulting in an increase in pressure of said target gas component; e) recovering at least a first portion of said target gas component at a second pressure higher than the pressure at the initiation of the heating of step d); f) reducing the pressure of the adsorbent bed to a third pressure lower than said second pressure and recovering a second portion of the target gas component; g) cooling at least a portion of said adsorbent bed at the feed end to a third temperature lower than said second temperature of step d); and h) repressurizing said adsorbent bed for the next adsorption cycle.

DETAILED DESCRIPTION OF THE EMBODIMENTS

All numerical values within the detailed description and the claims herein are modified by "about" or "approximately" the indicated value, and take into account experimental error and variations that would be expected by a person having ordinary skill in the art.

The present invention relates to a process for the separation of capturing target species (e.g., "target gas" or "target gas component") from a gas mixture containing the target species by a combination of pressure and temperature swing adsorption (PTSA). The regeneration of the adsorbent bed can be enhanced by conditions enabling desorption of the preferentially adsorbed component, by increasing the temperature of the adsorbent bed, e.g., by external means, while maintaining a sufficiently high pressure for subsequent downstream processing equipment. For example, it can often be desirable to recover components at elevated pressures, e.g., to reduce the cost of recompression for downstream processes. Such pressures can be in excess of 40 bar with inlet feed stream flow rates in excess of $10^8$ SCFD.

The state of the art for large scale rapid cycle TSA units is considerably less advanced than for large scale PSA units. Large scale, commercial TSA's typically have very slow cycles (on the order of about 10 hr/cycle) and are typically internally heated. The gas, or fluid, used to heat the adsorbent contactor in an internally heated temperature swing adsorption process can directly contact the adsorbent material. As such, the gas/fluid can generally pass through the same flow channels as the feed gas during the adsorption step and thus can come into direct contact with the adsorbent material. Preferred embodiments of the present invention can include externally heated adsorption processes in which the pressure on the adsorption bed/contactor can also be swung (i.e., a combination PSA/TSA process, also called PTSA). The externally heated temperature swing adsorption processes can employ adsorbent contactors having a separate set of channels to carry fluids used to heat and cool the contactor. The set of channels for transmitting cooling and heating fluids within the contactor can be sealed so that liquids or gases used to heat/cool the contactor can avoid contact with the adsorbent material(s) that were in fluid contact with the feed gas.

In a preferred embodiment, the PTSA process of the present invention can comprise an adsorption step in which the preferentially adsorbed components (target species) of the feed mixture can be adsorbed by the adsorbent of an adsorbent bed, while recovering the less preferentially adsorbed components at the product end of the adsorbent bed at process pressures. The process pressure represents the pressure at the outlet end of the contactor and can preferably be managed to be no more than 8 bara lower than the feed pressure (as measured at the entrance to the adsorbent bed, i.e., the inlet end of the contactor), e.g., no more than 4 bara lower or no more than 1 bara lower. The adsorption step of the present invention can be performed at a first temperature from $-195°$ C. to 300° C., preferably from 20° C. to 150° C. or from 30° C. to 120° C. Total feed pressures during the adsorption step can range from 1 bara to 600 bara, e.g., from 2 bara to 200 bara or from 10 bara to 150 bara. It can be preferred to manage the temperature rise from the heat of adsorption during the adsorption step. The system herein can thus be designed so that the heats of adsorption are in the range from 5 to 150 kJ/mol of molecules adsorbed. One method to manage the heat of adsorption can be to incorporate a thermal mass into the adsorption bed to mitigate the temperature rise occurring during the adsorption step. The temperature rise from the heat of adsorption can additionally or alternately be managed in a variety of ways, such as by flowing a cooling fluid through the passages external to the adsorbent bed (i.e., the passages that are used to heat and cool the contactor).

Additionally or alternately, the passages external to the adsorbent bed can be filled with a fluid that is not flowing during the adsorption process. In this case, the heat capacity of the fluid can serve to mitigate the temperature rise in the adsorbent bed. Combinations of some or all of these heat management strategies can be employed. Even with these heat management strategies, during this step, the final temperature of the bed can typically be slightly higher than the feed inlet temperature. Preferably, the degree of adsorption and cooling can be managed so that the maximum temperature rise at any point within the contactor can be less than 40° C., e.g., less than 20° C., less than 10° C., or less than 5° C. During adsorption, the strongest-adsorbing components can tend to attach most strongly to the adsorbent and can thus be least mobile. Such strongest-adsorbing components can thus tend to occupy regions of adsorbent closest to the inlet and can generally displace weakly adsorbed components from those regions.

Over the period of adsorption, the adsorbates can tend to order themselves from strongest to weakest, moving from inlet to outlet of the adsorption channels of the contactor. In preferred embodiments, the feed gas velocity can be chosen so that a relatively sharp concentration front moves through the contactor, i.e., such that the concentration gradient of adsorbate(s) extends over a relatively short distance, taking into consideration the absolute amplitude of the gradient.

The adsorption step can be stopped at a predetermined point before the adsorption front breaks through the product output end of the adsorbent bed. In certain preferred embodiments, the adsorption front can move at least 30% of the way down the bed, e.g., at least 50% or at least 80%, before the adsorption step is stopped. Additionally or alternately, the adsorption step can be conducted for a fixed period of time set by the feed flow rate and adsorbent capacity. Further additionally or alternately, the adsorption step can be conducted for a time less than 600 seconds, preferably less than 120 seconds, e.g., less than 40 seconds or less than 10 seconds. In some instances, the adsorption front can be allowed to break through the output end only for a short duration (e.g., for at most a few seconds), but it is usually preferred that the adsorption front not be allowed to break through, which can maximize utilization of the bed.

The term "break-through" is defined herein as the point where the product gas leaving the adsorbent bed exceeds the target specification of the contaminant component. At the break through point, the adsorbent bed can be considered "spent", such that any significant further operation through the spent adsorption bed alone will result in off-specification product gas. As used herein, the "breakthrough" can generally coincide with the "adsorption front", i.e., at the time breakthrough is detected at the outlet of the adsorbent bed, the adsorption front is generally located at the end of the adsorption bed.

After the adsorption step, the feed gas channels in the contactor can optionally be depressurized to a pressure such that less than 40% of the molecules adsorbed in the contactor desorb (e.g., less than 20% or less than 10%). This pressure can typically be greater than the sum of fugacity of the selectively adsorbed species in the feed.

The feed input end of the adsorbent bed can then be sealed with respect to the passage of a gas, and heat can be externally applied to the adsorbent bed. By "externally heated" we mean that heat is not applied directly to the adsorbent bed through the flow channels through which the feed gas mixture had flowed and into which the target gas component will be desorbed. The heat can preferably be delivered to the adsorbent bed through a plurality of heating/cooling channels in thermal communication, but not in fluid communication, with the feed gas flow channels of the adsorbent. The adsorbent bed can be externally heated co-currently or counter-currently along its length with respect to the flow of the feed gas mixture, or in a combination of co-current and counter-current heating steps. The flow channels that will carry heating and cooling fluid can preferably be in physical contact with the adsorbent bed to enhance heat transfer. The adsorbent bed can be heated to a second temperature higher than the first temperature used during the adsorption step, the second temperature preferably at least 10° C. higher than the first temperature, e.g., at least 20° C. higher, at least 40° C. higher, or at least 90° C. higher; additionally or alternately, the second temperature can be from 10° C. to 300° C., e.g., from 20° C. to 200° C. or from 40° C. to 120° C.

During the heating step, the gas pressure in the channel can tend to rise. To improve regeneration at the product end of the bed, during the heating step, the bed can advantageously be slowly purged with clean gas, e.g., clean product gas, from the clean end (product end) of the adsorbent bed to the point of product recovery. The purge can be introduced at a pressure higher than the pressure in the adsorbent bed. It can be preferred for the total number of moles of purge gas introduced to be less that the number of moles of molecules adsorbed in the contactor, e.g., less than 25% or less that 10% of the number of moles adsorbed. By preventing the adsorption front from breaking through, the product end of the bed can be kept substantially free of the strongly-adsorbed species and can advantageously contain predominantly product species. The isotherms of the adsorbed target component can determine the partial pressure of the preferentially adsorbed component in equilibrium, with the new loading at the higher temperature. This partial pressure can, in some cases, be in excess of 40% greater than the feed pressure, or as much as 70% higher or more. Additionally or alternately to the recovered sensible heat, a small amount of extra heat may be required to heat the bed to the final predetermined temperature. The isotherm can describe the amount of loading (mmol of adsorbed species per gram of adsorbent) for both chemisorption and physisorption processes. Without being bound by theory, the present invention can be effective because of the decrease in loading (i.e., mmol/gram) with increasing temperature.

The external heating can be conducted such that a thermal wave is used to pass heat through the contactor, as it transitions from the adsorption step to the regeneration step, in transitioning from the regeneration to adsorption step, in at least part of the regeneration step, and/or in at least part of the adsorption step. Similarly, it can be preferred to utilize a thermal wave in the cooling step. The use of a thermal wave in temperature swing adsorption is disclosed in detail in U.S. Patent Application Publication No. 2008/0314245, which is incorporated herein by reference. A thermal wave is a relatively sharp temperature gradient, or front, that can move linearly (i.e., approximately in a single direction within the contactor) during at least one step in the thermal swing adsorption/desorption cycle. The speed at which the thermal front (i.e., region with sharp temperature gradient) can move is referred to as the thermal wave velocity. The thermal wave velocity need not be constant, and the thermal wave direction need not be the same in both adsorption and regeneration steps. For example, the wave can move co-currently, counter-currently, or cross-flow in the adsorption and/or regeneration steps. It is also possible to design a process in which there is no significant thermal wave present in the adsorption step while there is a significant thermal wave in the regeneration step. The presence of a thermal wave in at least some portion of the thermal swing adsorption/regeneration cycle can enable the overall system to achieve a goal of substantially recuperating and recovering the heat required to temperature-swing the adsorbent bed. This, in turn, can improve process efficiency and/or can enable the use of high desorption temperatures that would not normally be considered for TSA operation.

In a preferred embodiment of the present invention the contactor is combined with an adsorbent into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. Preferably, the heat adding/removing channels can be designed and operated in a manner that results in a relatively sharp temperature wave in both the adsorbent and in the heating and cooling fluids during the heating and cooling steps in the cycle. An example of a contactor that can produce a relatively sharp thermal wave is a contactor according to the present invention.

Thermal waves in such contactors can be produced in when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

In a preferred embodiment, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternately, during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, it can be preferred that the recovered energy be used to reduce the amount of sensible heat that must be supplied to heat and cool the contactor. The sensible heat is determined by the heat capacity and temperature rise (or fall) of the contactor. In some preferred embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

This external heating of the partially sealed adsorbent bed will result in at least a portion of the target species being desorbed from the adsorbent bed. It also results in an increase in pressure of the resulting target species component stream, which is desirable for purposes of this invention. At least a portion of the desorbed target species component is preferably recovered at pressures higher than that at the initiation of the heating step. That is, recovery of target gas will preferably take place toward the end of the heating step with minimum or no depressurization of the adsorbent bed. It is preferred that the pressure be a least 2 bar, more preferably at least 5 bar higher than that at the initiation of the heating step.

The pressure in the adsorbent bed is then reduced, preferably in a series of blow-down steps in a co-current or counter-current and can be performed with or without a purge gas stream to the final target gas recovery pressure. Pressure reduction preferably occurs in less than 8 steps, preferably in less than 4 steps, with target species being recovered in each step. In one preferred embodiment, the pressure is decreased by a factor of approximately three in each step. It is also preferred that the depressurization be conducted counter-currently and that during the depressurizing step a purge gas be passed counter-current (from product end to feed end) through the adsorbent bed. It is also preferred that the purge gas be a so-called "clean gas". By "clean gas" we mean a gas that is substantially free of target gas components. For example, if the target gas is an acid gas, then the clean gas will be a stream substantially free of acid gases such as $H_2S$ and $CO_2$. In a preferred embodiment, clean gas will contain less than 5 mol % of combined $H_2S$ and $CO_2$, and even more preferably less than 1 mol % of combined $H_2S$ and $CO_2$. An example of a preferred clean gas would be the product gas itself. When the current invention is utilized for the removal of acid gas from a natural gas stream, in a preferred embodiment, the "clean gas" is comprised of at least one of the hydrocarbon product streams, and in another preferred embodiment is comprised of $C_{3-}$ hydrocarbons, and in a most preferred embodiment is comprised of methane. In other preferred embodiments, a separate "clean gas" can be used. In one of these embodiments, the "clean gas" is comprised of nitrogen.

In a preferred embodiment, in any step, other than the adsorption step, the clean gas is conducted counter-currently through the adsorbent bed to ensure that the end of the bed is substantially free of target species. In a more preferred embodiment, the clean gas is conducted counter-currently through the adsorbent bed in at least a portion of the desorption steps. An effective rate of counter-current flowing clean gas is preferred during these step(s) to overcome mass diffusion to ensure that the product end of the bed is kept substantially free of the target species.

After the target gas has been recovered, the adsorbent bed can be cooled and repressurized. It can generally be preferred to cool the bed before repressurization. The adsorbent bed can be cooled, preferably to a temperature that is no more than 40° C. above the temperature of feed gas mixture, e.g., no more than 20° C. above or no more than 10° C. above. Additionally or alternately, the adsorbent bed can be cooled by external cooling in a co-current or counter-current manner, such that a thermal wave can pass through the bed. In some such embodiments, it can be preferred for the first part of the adsorbent bed to be cooled then repressurized. In certain of those embodiments, less than 90% of the length of adsorption bed can be cooled, e.g., less than 50%. The adsorbent bed can additionally or alternately be purged with a clean gas during cooling.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$ ($T_{10}$) and about 10% below $T_{max}$ ($T_{90}$). Thermal waves can be said to be relatively sharp when at least the temperature differential of ($T_{90}-T_{10}$) occurs over at most 50% (e.g., at most 40%, at most 30%, or at most 25%) of the length of the apparatus that participates in the mass/thermal transfer. Additionally or alternately, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and a represents the effective thermal diffusivity of the contactor (in $m^2/s$) over the distance L. In addition or alternately to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternately, to minimize size and energy requirements, it can be preferred for L to be less than 0.1 meter, e.g., less than 0.01 meter or less than 0.001 meter.

The adsorbent bed can then be repressurized, during and/or after the cooling step, e.g., using clean product gas or countercurrently with blow-down gas from another bed after a first stage of repressurization. The final pressure of the repressurization step can preferably be substantially equal to the pressure of the incoming feed gas mixture.

In some embodiments, the adsorbent bed can preferably be in the form of open flow channels, e.g., parallel channel connectors, in which the majority of the open pore volume is attributable to microporous pore diameters, e.g., in which less than 40%, more preferably less than 20%, for example less than 15% or less than 10%, of its open pore volume can originate from pore diameters greater than 20 angstroms (and less than about 1 micron; i.e., from mesoporous and macroporous pore diameters). A flow channel is described herein as that portion of the contactor in which gas flows if a steady state pressure difference is applied between the point/place at which a feed stream enters the contactor and the point/place a product stream leaves the contactor. By "open pore volume" herein, it is meant all of the open pore space not occupied in the volume encompassed by the adsorbent material. The open pore volume includes all open spaces in the volume encompassed by the adsorbent material, including but not limited to all volumes within the adsorbent materials themselves, including the pore volume of the structured or amorphous materials, as well as any interstitial open volumes within the structure of the portion of the bed containing the adsorbent material. Open pore volume, as used herein, does not include spaces not accompanied by the adsorbent material such as open volumes in the vessel for entry, exit, or distribution of gases (such as nozzles or distributor areas), open flow channels, and/or volumes occupied by filler materials and/or solid heat adsorption materials. "Parallel channel contactors" are defined herein as a subset of adsorbent contactors comprising structured (engineered) adsorbents in which substantially parallel flow channels are incorporated into the adsorbent structure (typically the adsorbents can be incorporated onto/into the walls of such flow channels). Non-limiting examples of geometric shapes of parallel channel contactors can include various shaped monoliths having a plurality of substantially parallel channels extending from one end of the monolith to the other; a plurality of tubular members, stacked layers of adsorbent sheets with and without spacers between each sheet; multi-layered spiral rolls; spiral wound adsorbent sheets; bundles of hollow fibers; as well as bundles of substantially parallel solid fibers; and combinations thereof. Parallel flow channels are described in detail, e.g., in U.S. Patent Application Publication Nos. 2008/0282892 and 2008/0282886, both of which are incorporated herein by reference. These flow channels can be formed by a variety of ways, and, in addition to the adsorbent material, the adsorbent contactor structure may contain items such as, but not limited to, support materials, heat sink materials, void reduction components, and heating/cooling passages.

In the practice of the present invention, it can be desirable to operate with a multiplicity of contactor units, with several coupled in a heating/cooling operation and others involved in adsorption (and/or desorption). In such an operation, the contactor can be substantially cooled by a circulating heat transfer medium before it is switched into service for adsorption. One advantage of such an operation can be that the thermal energy used to swing the bed is retained in the heat transfer medium. If adsorption were to proceed simultaneously with cooling, then a substantial part of the heat in the bed could be lost to the adsorbate-free feed, and a higher heat load could be needed to restore the high temperature of the heat transfer medium.

Examples of adsorbent materials that can be used include, but are not limited to, high surface area (greater than about 10 $m^2/g$, preferably greater than about 75 $m^2/g$) alumina, microporous zeolites (preferably with particle sizes less than about 1 mm), other microporous materials, mesoporous materials, ordered mesoporous materials, and the like, and combinations thereof. Non-limiting examples of these materials can include carbon, cationic zeolites, high silica zeolites, highly siliceous ordered mesoporous materials, sol-gel materials, ALPO materials (microporous and/or mesoporous materials containing predominantly aluminum, phosphorous, and oxygen), SAPO materials (microporous and/or mesoporous materials containing predominantly silicon, aluminum, phosphorous, and oxygen), MOF materials (microporous and/or mesoporous materials comprised of a metal organic framework), ZIF materials (microporous and/or mesoporous materials comprised of zeolitic imidazolate frameworks), microporous and/or mesoporous sorbent functionalized with functional groups (e.g., including primary, secondary, and tertiary amines, other non-protogenic basic groups such as amidines, guanidines, biguanides, and the like, as well as combinations thereof), and combinations and intergrowths thereof. For the adsorption and removal of acidic gases such as hydrogen sulfide and carbon dioxide typically found in natural gas streams, adsorbents such as cationic zeolites, amine-functionalized mesoporous materials, stannosilicates, and carbon may advantageously be utilized.

In preferred applications of the present contactors, $CO_2$ can be removed from natural gas in the swing adsorption process. Here, it can be preferred to formulate the adsorbent with a specific class of 8-ring zeolite materials that has a kinetic selectivity, though equilibrium-based adsorption can be an alternative. The kinetic selectivity of this class of 8-ring zeolite materials can allow $CO_2$ to be rapidly transmitted into zeolite crystals while hindering the transport of methane, so that it is possible to selectively separate $CO_2$ from a mixture of $CO_2$ and methane. For the removal of $CO_2$ from natural gas, this specific class of 8-ring zeolite materials can have an Si/Al ratio greater than about 250, e.g., greater than about 500, greater than about 1000, from 2 to about 1000, from about 10 to about 500, or from about 50 to about 300. As used herein, the Si/Al ratio is defined as the molar ratio of silica to alumina of the zeolitic structure. This class of 8-ring zeolites can allow $CO_2$ to access the internal pore structure through 8-ring windows in a manner such that the ratio of single component diffusion coefficients for $CO_2$ over methane (i.e., $D_{CO2}/D_{CH4}$) can be greater than 10, preferably greater than about 50, greater than about 100, or greater than about 200.

Additionally or alternately, in many instances, nitrogen may desirably be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas, like with $CO_2$, it can be preferred to formulate the adsorbent with a class of 8-ring zeolite materials that has a kinetic selectivity. The kinetic selectivity of this class of 8-ring materials can allow $N_2$ to be rapidly transmitted into zeolite crystals while hindering the transport of methane, so that it is possible to selectively separate $N_2$ from a mixture of $N_2$ and methane. For the removal of $N_2$ from natural gas, this specific class of 8-ring zeolite materials can have an Si/Al ratio from about 2 to about 1000, e.g., from about 10 to about 500 or from about 50 to about 300. This class of 8-ring zeolites can allow $N_2$ to access the internal pore structure through 8-ring windows in a manner such that the ratio of single component diffusion coefficients for $N_2$ over methane (i.e., $D_{N2}/D_{CH4}$) can be greater than 5, preferably greater than about 20, greater than about 50, or greater than 100. Resistance to fouling in swing adsorption processes during the removal of $N_2$ from natural gas can be one advantage offered by this class of 8-ring zeolite materials.

Additionally or alternately from $CO_2$, it can be desirable to remove $H_2S$ from natural gas which can contain from about 0.001 vol % $H_2S$ to about 70 vol % $H_2S$ (e.g., from about 0.001 vol % to about 30 vol %, from about 0.001 vol % to about 10 vol %, from about 0.001 vol % to about 5 vol %, from about 0.001 vol % to about 1 vol %, from about 0.001 vol % to about 0.5 vol %, or from about 0.001 vol % to about 0.1 vol %). In some applications, it can be desired for $H_2S$ to be removed to the ppm or ppb levels.

In some preferred embodiments, the swing adsorption process can be rapidly cycled, in which case the process of the present invention is referred to as rapid cycle pressure-temperature swing adsorption (RCPTSA). The total cycle time can advantageously be less than 2400 seconds, preferably less than 600 seconds, e.g., less than 120 seconds or less than 60 seconds. This is in contrast to a conventional PTSA process, which is typically in the range of 60 minutes to 1200 minutes.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. patent application bearing docket number 2011EM060-US2, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-TSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(h) using feed compression before one or more RC-TSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

Additionally or alternately, the invention can comprise one or more of the following embodiments.

Embodiment 1. A process for the separation of a target gas component from a gas mixture, which process comprises: a) conducting the gas mixture containing said target gas component to an adsorption step by introducing it into the feed input end of an adsorbent bed selective for adsorbing said target gas component, which adsorbent bed has a feed input end and a product output end and which adsorbent bed is operated at a first pressure and at a first temperature wherein said target gas component is adsorbed by the adsorbent bed and wherein a gaseous product depleted in the target gas component exits the product output end of said adsorbent bed; b) stopping the introduction of said gas mixture to said adsorbent bed before breakthrough of said target gas component reaches the product output end of said adsorbent bed; c) sealing the feed input end of said adsorbent bed; d) heating the sealed adsorbent bed to a second temperature higher than said first temperature, resulting in desorption of at least a portion of said target gas component from said adsorbent bed and thereby resulting in an increase in pressure of said target gas component; e) recovering at least a first portion of said target gas component at a second pressure higher than the pressure at the initiation of the heating of step d); f) reducing the pressure of the adsorbent bed to a third pressure lower than said second pressure and recovering a second portion of the target gas component; g) cooling at least a portion of said adsorbent bed at the feed end to a third temperature lower than said second temperature of step d); and h) repressurizing said adsorbent bed for the next adsorption cycle.

Embodiment 2. The process of embodiment 1, wherein adsorbent the bed is counter-currently depressurized before step c) to a pressure that is less than the first pressure.

Embodiment 3. The process of embodiment 1 or embodiment 2, wherein one or more of the following are satisfied: the first temperature is from −195° C. to 300° C. (e.g., from 20° C. to 150° C.); the first pressure is from 1 bara to 600 bara (e.g., from 2 bara to 200 bara); the second temperature is from (e.g., from 20° C. to 200° C.); the third temperature is from −195° C. to 300° C.; and the gas mixture is a natural gas stream.

Embodiment 4. The process of any one of the previous embodiments, wherein the target gas component is selected from the group consisting of $CO_2$, $H_2S$, and a combination thereof.

Embodiment 5. The process of embodiment 4, wherein the target species comprises $H_2S$, wherein the product outlet end of said adsorbent bed contains no more than 4 vppm $H_2S$, and wherein the feed gas mixture contains between 6 vppm and 10,000 vppm $H_2S$.

Embodiment 6. The process of any one of the previous embodiments, wherein the adsorbent bed has open flow channels throughout its entire length through which the gas mixture flows and/or is a parallel channel contactor.

Embodiment 7. The process of any one of the previous embodiments, wherein (i) the reduction in pressure of step f) takes place in two or more steps wherein each step reduces the pressure of the adsorbent bed to a lower pressure than the previous step, and/or (ii) the external heating of step d) takes place co-current to the direction of the flow of the gas mixture through the adsorbent bed or counter-current to the direction of the flow of the gas mixture through the adsorbent bed.

Embodiment 8. The process of any one of the previous embodiments, wherein the adsorbent bed is comprised of an adsorbent material: that is an 8-ring zeolite having a Si/Al ratio greater than 500; that is selected from the group consisting of DDR, Sigma-1, ZSM-58, and combinations and intergrowths thereof; that has a diffusion coefficient for $CO_2$ over methane ($D_{CO2}/D_{CH4}$) greater than 10; that has a diffusion coefficient for $N_2$ over methane ($D_{N2}/D_{CH4}$) greater than 10; and/or that has a diffusion coefficient for $H_2S$ over methane ($D_{H2S}/D_{CH4}$) greater than 10.

Embodiment 9. The process of embodiment 8, wherein one or more of the following are satisfied: a clean gas stream with less than 1 mol % of combined $H_2S$ and $CO_2$ is conducted through the adsorbent bed in a flow direction counter-current to the direction of the flow of the gas mixture through the adsorbent bed (e.g., concurrent with at least a portion of step e), such as with at least a portion of each of steps e), f) and g)); the first pressure is at least 500 psig; and a clean gas stream comprising $N_2$ is conducted through the adsorbent bed in a flow direction counter-current to the direction the gas mixture flow through the adsorbent bed.

Embodiment 10. The process of any one of the previous embodiments, wherein the heating of step d) is performed in such a way as to cause a thermal wave to travel along the adsorbent bed, e.g., co-current to the direction the gas mixture flow.

Embodiment 11. The process of embodiment 10, wherein a $T_{90}$ and a $T_{10}$ can be defined with respect to the second temperature and the first temperature such that a temperature differential of ($T_{90}-T_{10}$) occurs over at most 50% of the length of the adsorbent bed.

Embodiment 12. The process of embodiment 10, wherein the thermal wave exhibits a maximum Peclet number, Pe, less than 10, wherein Pe=(U*L)/α, where U represents a heat exchange fluid velocity, L represents a characteristic distance over which heat is transported in a direction roughly perpendicular to fluid flow, and a represents an effective thermal diffusivity of the contactor over the distance L, and wherein U is from about 0.01 m/s to about 100 m/s, and L is less than 0.1 meter.

Embodiment 12. The process of any one of the previous embodiments, wherein less than about 40% of the open pores of the adsorbent bed have diameters greater than about 20 Angstroms and less than about 1 micron.

Embodiment 13. The process of any one of the previous embodiments, wherein the adsorbent bed is comprised of a microporous adsorbent material selected from zeolites, AlPOs, SAPOs, MOFs, ZIFs, carbon, and combinations thereof.

Embodiment 14. The process of any one of the previous embodiments, wherein the adsorbent bed is comprised of an adsorbent material selected from cationic zeolites, amine-functionalized mesoporous materials, stannosilicates, carbon, and combinations thereof.

The following conceptual examples are presented to illustrate embodiments of the present invention and are not meant to necessarily limit the scope of the claimed invention.

EXAMPLES

Example 1

A process for acid gas removal from natural gas having a feed flow rate of ~109 SCFD and containing ~72% acid gas ($CO_2$+$H_2S$) was evaluated. This process uses an adsorbent having idealized linear adsorption isotherms obtained for a high silica chabazite (CHA) zeolite adsorbent. Based on the isotherm known during the adsorption step, and a heat of adsorption of ~25 kJ/mol, adsorption isotherms were generated at ~104° C., ~120° C., ~150° C., ~175° C., ~200° C., and ~220° C.

The process in this Example was comprised of the following steps:

1) High pressure adsorption performed at about 104° C. During this step, the heat of adsorption is given up and stored in the adsorbent bed and the thermal mass. This sensible heat can be recovered from the bed by means such as cross exchanging with a fluid. During this step, the final temperature of the bed can be slightly higher than the adsorption temperature.
2) In the second step, the bed is sealed and its temperature is raised to a higher temperature to thermally regenerate the bed. The above calculations predict the partial pressure of $CO_2$ in equilibrium with the new loading at the higher temperature. In addition to the recovered sensible heat, a small amount of additional heat may be required to heat the bed to the final temperature.

The idealized average recovery pressure is calculated based on a final blow-down pressure of ~5 bar, and the assumption of a linear recovery. The true recovery pressure will typically be lower than this value, which is considered to be an upper bound. The data based on the process herein in the last column of Table 1 below suggests that this scheme has the potential to generate acid gas at a high recovery pressure.

TABLE 1

Calculated $CO_2$ Recovery Pressures at Various Bed Temperatures

| Temp. (° C.) | Sorbent Loading (mmol/cc) | $CO_2$ Pressure in Channel (bar) | Avg. Ideal Recovery Pressure (bar) |
|---|---|---|---|
| 104 | 1.65 | 45.0 | 16.7 |
| 120 | 1.43 | 54.1 | 29.5 |
| 150 | 1.09 | 70.4 | 37.7 |
| 175 | 0.86 | 83.0 | 44.0 |
| 200 | 0.69 | 94.5 | 49.8 |
| 220 | 0.58 | 103 | 54.0 |

The PTSA scheme proposed above has the potential to generate acid gas at recovery pressures comparable to the feed pressure at high temperatures above around 175° C.

Example 2

Table 2 below is a PTSA design for acid gas removal from a gaseous stream. The corresponding recovery pressures of the feed, product, and exhaust gases are shown below. The PTSA design of the present invention enables recovery of acid gas in stages of ~527, ~176, and ~59 psia. The average recovery pressure is increased.

TABLE 2

Calculated Acid Gas Recovery at High Pressures using 3-Stage Recovery Feed and Product Stream Data

|  |  | Feed | Product | Exhaust | | |
|---|---|---|---|---|---|---|
|  | Units | Dry Gas | Sweet Gas | HP Acid Gas | MP Acid Gas | LP Acid Gas |
| Phase |  | V | V | V | V | V |
| Flow (total) | MSCFD | 1000 | 885 | 56.3 | 37.0 | 21.6 |
|  | lb-mole/h | 1.10E+05 | 9.72E+04 | 6.18E+03 | 4.06E+03 | 2.37E+03 |
| Pressure | psia | 634 | 554 | 527 | 176 | 59 |
| Temperature | ° F. | 67 | 106 | 428 | 428 | 428 |
| Composition | Mole %/(ppm) |  |  |  |  |  |
| Nitrogen |  | 0.60 | 0.66 | 0.10 | 0.10 | 0.10 |
| Carbon Dioxide |  | 11.8 | 0.57 | 98.6 | 98.6 | 98.6 |
| Hydrogen Sulfide |  | (47) | 0.0003 | 0.038 | 0.038 | 0.038 |
| Methane |  | 80.0 | 90.2 | 1.23 | 1.23 | 1.23 |
| Ethane |  | 5.42 | 6.12 | 0.042 | 0.042 | 0.042 |
| Propane |  | 1.83 | 2.07 | 0.007 | 0.007 | 0.007 |
| i-Butane |  | 0.12 | 0.14 | (2) | (2) | (2) |
| n-Butane |  | 0.18 | 0.20 | (3) | (3) | (3) |
| i-Pentane |  | 0.020 | 0.023 | (0.4) | (0.4) | (0.4) |
| n-Pentane |  | 0.020 | 0.023 | (0.3) | (0.3) | (0.3) |
| n-Hexane |  | (91) | 0.010 | (0.1) | (0.1) | (0.1) |
| n-Heptane |  | (38) | (43) | 0 | 0 | 0 |
| n-Octane |  | (8) | (9) | 0 | 0 | 0 |
| n-Nonane |  | (0.2) | (0.2) | 0 | 0 | 0 |
| Decane+ |  | (0.1) | (0.1) | 0 | 0 | 0 |
| Water |  |  | (6) | 0.005 | 0.005 | 0.005 |

As can be seen from this Example and the corresponding data in Table 2, process embodiments of the present invention are able to operate at very high Feed pressures, well in excess of 500 psig, while maintaining Product pressures above ~500 psig. Also, as can be seen in Table 2, the Product (Sweet Gas) was able to be retrieved at very low concentrations of both $CO_2$ (~0.57 mol %) and $H_2S$ (~0.0003 mol %) while increasing the overall Methane concentration (from ~80.0 mol % in the Feed to ~90.2 mol % in the Product).

In the processes of this Example, recovery of the overall hydrocarbons, in particular methane, is very high with only about 1.23 mol % of methane in the exhaust stages.

What is claimed is:

1. A process for the separation of a target gas component from a gas mixture, which process comprises:
   a) conducting the gas mixture containing said target gas component to an adsorption step by introducing it into the feed input end of an adsorbent bed selective for adsorbing said target gas component, which adsorbent bed has a feed input end and a product output end and which adsorbent bed is operated at a first pressure and at a first temperature wherein said target gas component is adsorbed by the adsorbent bed and wherein a gaseous product depleted in the target gas component exits the product output end of said adsorbent bed;
   b) stopping the introduction of said gas mixture to said adsorbent bed before breakthrough of said target gas component reaches the product output end of said adsorbent bed;
   c) sealing the feed input end of said adsorbent bed;
   d) heating the sealed adsorbent bed to a second temperature higher than said first temperature, resulting in desorption of at least a portion of said target gas component from said adsorbent bed and thereby resulting in an increase in pressure of said target gas component;
   e) recovering at least a first portion of said target gas component at a second pressure higher than the pressure at the initiation of the heating of step d);
   f) reducing the pressure of the adsorbent bed to a third pressure lower than said second pressure and recovering a second portion of the target gas component;
   g) cooling at least a portion of said adsorbent bed at the feed end to a third temperature lower than said second temperature of step d); and
   h) repressurizing said adsorbent bed for the next adsorption cycle.

2. The process of claim 1, wherein adsorbent the bed is counter-currently depressurized before step c) to a pressure that is less than the first pressure.

3. The process of claim 1, wherein the first temperature is from −195° C. to 300° C. and the first pressure is from 1 bara to 600 bara.

4. The process of claim 3, wherein the first temperature is from 20° C. to 150° C. and the first pressure is from 2 bara to 200 bara.

5. The process of claim 1, wherein the second temperature is from 10° C. to 300° C.

6. The process of claim 5, wherein the second temperature is from 20° C. to 200° C.

7. The process of claim 1, wherein the third temperature is from −195° C. to 300° C.

8. The process of claim 1, wherein the gas mixture is a natural gas stream.

9. The process of claim 8, wherein the target gas component is selected from the group consisting of $CO_2$, $H_2S$, and a combination thereof.

10. The process of claim 9, wherein the target species comprises $H_2S$, wherein the product outlet end of said adsorbent bed contains no more than 4 vppm $H_2S$, and wherein the feed gas mixture contains between 6 vppm and 10,000 vppm $H_2S$.

11. The process of claim 1, wherein the adsorbent bed has open flow channels throughout its entire length through which the gas mixture flows.

12. The process of claim 11, wherein the adsorbent bed is a parallel channel contactor.

13. (Original The process of claim 1, wherein reduction in pressure of step f) takes place in two or more steps wherein each step reduces the pressure of the adsorbent bed to a lower pressure than the previous step.

14. The process of claim 1, wherein the heating of step d) takes place co-current to the direction of the flow of the gas mixture through the adsorbent bed and wherein the heating is external.

15. The process of claim 1, wherein the heating of step d) takes place counter-current to the direction of the flow of the gas mixture through the adsorbent bed and wherein the heating is external.

16. The process of claim 1, wherein the adsorbent bed is comprised of an adsorbent material that is an 8-ring zeolite having a Si/Al ratio greater than 500.

17. The process of claim 16, wherein the 8-ring zeolite is selected from the group consisting of DDR, Sigma-I, ZSM-58, and combinations and intergrowths thereof.

18. The process of claim 1, wherein the heating of step d) is performed in such a way as to cause a thermal wave to travel along the adsorbent bed.

19. The process of claim 18, wherein the thermal wave travels co-current to the direction the gas mixture flows through the adsorbent bed.

20. The process of claim 18, wherein a $T_{90}$ and a $T_{10}$ can be defined with respect to the second temperature and the first temperature such that a temperature differential of $(T_{90}-T_{10})$ occurs over at most 50% of the length of the adsorbent bed.

21. The process of claim 18, wherein the thermal wave exhibits a maximum Peclet number, Pe, less than 10, wherein $Pe=(U*L)/\alpha$, where U represents a heat exchange fluid velocity, L represents a characteristic distance over which heat is transported in a direction roughly perpendicular to fluid flow, and $\alpha$ represents an effective thermal diffusivity of the contactor over the distance L, and wherein U is from about 0.01 m/s to about 100 m/s, and L is less than 0.1 meter.

22. The process of claim 1, wherein less than about 40% of the open pores of the adsorbent bed have diameters greater than about 20 Angstroms and less than about 1 micron.

23. The process of claim 9, wherein a clean gas stream with less than 1 mol % of combined $H_2S$ and $CO_2$ is conducted through the adsorbent bed in a flow direction counter-current to the direction of the flow of the gas mixture through the adsorbent bed.

24. The process of claim 23, wherein the clean gas stream is conducted through the adsorbent bed concurrent with at least a portion of step e).

25. The process of claim 24, wherein the clean gas stream is conducted through the adsorbent bed concurrent with at least a portion of each of steps e), f) and g).

26. The process of claim 9, wherein the first pressure is at least 500 psig.

27. The process of claim 9, wherein a clean gas stream comprising $N_2$ is conducted through the adsorbent bed in a flow direction counter-current to the direction the gas mixture flow through the adsorbent bed.

28. The process of claim 16, wherein the zeolite has a diffusion coefficient for $CO_2$ over methane $(D_{CO2}/D_{CH4})$ greater than 10.

29. The process of claim 16, wherein the zeolite has a diffusion coefficient for $N_2$ over methane $(D_{N2}/D_{CH4})$ greater than 10.

30. The process of claim 16, wherein the zeolite has a diffusion coefficient for $H_2S$ over methane $(D_{H2S}/D_{CH4})$ greater than 10.

31. The process of claim 16, wherein the zeolite is selected from DDR, Sigma-1, and ZSM-58.

32. The process of claim 1, wherein the adsorbent bed is comprised of a microporous adsorbent material selected from zeolites, AlPOs, SAPOs, MOFs, ZIFs, carbon, and combinations thereof.

33. The process of claim 1, wherein the adsorbent bed is comprised of an adsorbent material selected from cationic zeolites, amine-functionalized mesoporous materials, stannosilicates, carbon, and combinations thereof.

* * * * *